United States Patent [19]
Van Sickle et al.

[11] Patent Number: 5,811,960
[45] Date of Patent: Sep. 22, 1998

[54] BATTERY-LESS UNINTERRUPTABLE SEQUEL POWER SUPPLY

[75] Inventors: Robert J. Van Sickle, Richmond; Darren T. Roberts, Chesterfield, both of Va.

[73] Assignee: United Power Corporation, Richmond, Va.

[21] Appl. No.: 720,617

[22] Filed: Oct. 2, 1996

[51] Int. Cl.$^6$ ................................................ H02K 7/02
[52] U.S. Cl. ................................................ 322/4; 307/67
[58] Field of Search ................... 307/64, 67; 322/4, 322/32

[56] References Cited

U.S. PATENT DOCUMENTS

| | | | |
|---|---|---|---|
| 2,688,704 | 9/1954 | Christenson | 290/4 |
| 3,243,598 | 3/1966 | Grillo | 307/68 |
| 3,458,710 | 7/1969 | Dodge | 290/4 |
| 4,203,041 | 5/1980 | Sachs | 307/67 |
| 4,340,823 | 7/1982 | Miyazawa | 307/66 |
| 4,356,402 | 10/1982 | Morimoto et al. | 307/19 |
| 4,460,834 | 7/1984 | Gottfried | 307/64 |
| 4,719,550 | 1/1988 | Powell et al. | 363/37 |
| 4,789,790 | 12/1988 | Yamanaka | 307/66 |
| 4,827,152 | 5/1989 | Farkas | 307/68 |
| 5,194,757 | 3/1993 | Wertheim | 307/87 |
| 5,300,819 | 4/1994 | Lee | 307/47 |
| 5,317,500 | 5/1994 | Iden et al. | 363/98 |
| 5,332,927 | 7/1994 | Paul et al. | 307/66 |
| 5,581,168 | 12/1996 | Rozman et al. | 318/723 |
| 5,587,647 | 12/1996 | Bansal et al. | 322/45 |
| 5,646,458 | 7/1997 | Bowyer et al. | 307/67 |

OTHER PUBLICATIONS

"Continuous Power Supply Systems," Holec, (pre–Mar. 18, 1996), pp. 6.1.2–1 to 6.1.2–11.
"Continuous Power Quality Protection System," Statordyne (1994), 4 pages.
"No Break KS–Comparison With Other UPS Systems," Euro–Diesel (Jan. 1992), pp. 1–10.
"No Break KS–Presentation," Euro–Diesel (Jan. 1992), pp. 1–5.
"No–Break Power System—Small Size but High Performance", *Design Engineering* (Jan. 1977), pp. 13–15.

*Primary Examiner*—Steven L. Stephan
*Assistant Examiner*—Nicholas Ponomarenko
*Attorney, Agent, or Firm*—Banner & Witcoff, Ltd.

[57] ABSTRACT

A battery-less uninterruptable sequel power supply that converts mechanical rotation generated by a local power source to electrical power in the event of commercial line power distortion or failure is provided. The uninterruptable sequel power supply uses a voltage and frequency-tolerant rectifier-inverter combination that converts the decaying output of a de-accelerating synchronous alternating current machine to a stable alternating current voltage for driving a critical load. In the arrangement of the invention, there is no need to maintain rotary velocity of the synchronous alternating current machine during the transitory period between fault detection and connection of a prime mover.

29 Claims, 2 Drawing Sheets

5,811,960

BATTERY-LESS UNINTERRUPTABLE SEQUEL POWER SUPPLY

FIELD OF THE INVENTION

The present invention relates to backup power systems and, more particularly, to uninterruptable power systems that convert mechanical rotation generated by a local power source to electrical power in the event of commercial line power distortion or failure. The electrical power generated by the invention is free from unacceptable voltage variations.

BACKGROUND OF THE INVENTION

It is well known that commercial power reliability is inadequate for a number of applications, such as, for example, banking, health care, computer facilities, and national security. A preferred technique for increasing commercial power reliability is to provide an alternate local power source, such as, for example, an internal combustion or diesel engine, and a generator, such as, for example, a synchronous alternating current generator, that becomes available upon detection of a power outage or in the event of irregularities that are outside predetermined tolerances.

A transition time between detection of the voltage irregularity or outage and operation of the local backup power source typically ranges from, for example, 2 to 10 seconds. For many applications, such as computer based operations, a power interruption of this duration is unacceptable. Therefore a separate power source, working in concert with the backup, must be employed to provide the proper voltage during this interim or transition period.

Two techniques, static and rotary, are generally known for generating an alternating current in the event of commercial power irregularities or outage. A static system typically uses an inverter to generate the alternating current required by the load from a direct current voltage supply, such as, for example, a battery. A rotary system typically uses a synchronous alternating current generator to provide the alternating current to the load. The latter is used when a prime mover, for example an internal combustion or diesel engine, provides power to a synchronous alternating current generator by rotating a shaft.

One of the requirements attendant with conventional rotary systems is the maintenance of shaft speed during the transitory period between detection of unacceptable line power and initiation of prime mover operation. Maintenance of line voltage within required tolerances typically requires maintenance of the rotational velocity of the synchronous alternating current generator to within 0.8% of the nominal shaft speed. Various approaches have been used to maintain shaft speed during the transitory period to prevent this natural decay in rotational velocity. These approaches include, for example: storage of kinetic energy in an inductively coupled nested rotor; use of a flywheel to maintain shaft speed, such as shown in U.S. Pat. No. 4,460,834 and U.S. Pat. No. 2,688,704; compressed hydraulic fluid as shown in U.S. Pat. No. 4,827,152; and battery power as shown in U.S. Pat. No. 4,203,041, U.S. Pat. No. 3,458,710, and U.S. Pat. No. 3,243,598.

Japanese Patent No. 6-38,408 discloses the use of a battery driven inverter in an uninterruptable power supply to generate an alternating current voltage. The interim time prior to prime mover availability is bridged with a battery.

In addition to the above techniques found in uninterruptable power supplies, a technique known as variable-speed, constant frequency (VSCF) generator has been used as a primary power source for applications which do not have commercial power available, such as, for example, an airplane. U.S. Pat. No. 5,317,500 describes a VSCF system which is synchronized with an external power source, such as a power cart, prior to the transfer of power and the subsequent shutting down of the prime mover.

Conventional rotary systems waste considerable resources in attempting to maintain shaft speed during the transitory period. Moreover, preoccupation with maintaining shaft speed increases cost while having questionable benefits with respect to system efficiency. There are additional disadvantages associated with clutches, hydraulics, batteries and the like, that are used in conventional systems. Specifically, some of the costly service requirements imposed on conventional systems include clutch wear, bearing life, batteries requiring special environmental considerations in addition to having a relatively short life and costly disposal requirements.

SUMMARY OF THE INVENTION

The present invention overcomes the deficiencies set forth above with respect to the prior art. Specifically, the present invention alleviates the requirement of maintaining the rotational speed of a synchronous alternating current generator during the transitory period between the detection of power outage or irregularity detection and prime mover operational availability. A stable alternating current voltage and frequency is provided by an input voltage and frequency tolerant rectifier and inverter combination that is driven by a decaying alternating current voltage and frequency output generated by a de-accelerating synchronous alternating current machine. The rectifier converts the decaying alternating current voltage to a direct current voltage which is then converted to a stable alternating current voltage and frequency by the inverter.

The basic states of operation may be described by focusing on the role of a main power source, a prime mover, a synchronous alternating current machine, a rectifier, and an inverter. Operation may generally be described using four states: a no-power state, a start-up state, a main-power state, a bridging state, and a backup state.

A no-power state is present when no power is being provided by the main power source to any other components.

A start-up state is present when initial kinetic energy is being stored in the synchronous alternating current machine.

A main-power state is present once the synchronous alternating current machine has acquired the requisite kinetic energy. During this state, the main power source maintains the kinetic energy of the synchronous alternating current machine while also providing power to a critical load.

A bridging state is present when it becomes necessary, due to a main power outage or irregularity, to switch from the main power source to the prime mover. The alternating current machine converts the stored kinetic energy to a decaying alternating current voltage. During this state the alternating current machine is not receiving power from external sources. Accordingly, the rotational velocity of the machine, necessarily, decays, thus generating a decaying alternating current. The voltage and frequency-tolerant rectifier converts the decaying alternating current to a direct current which is then transformed to a stable alternating current voltage and frequency via the inverter. Consequently, the critical load is driven by the kinetic energy stored in the alternating current machine via the transformation provided by the synchronous alternating current machine/rectifier/inverter combination. If the power outage is brief in duration, e.g., less than the transitory period, it is possible to return directly to the main-power state by using only the kinetic energy of the synchronous alternating current machine to bridge the gap.

A backup state is present when the prime mover is operational and is supplying power to the critical load.

Transition between each of the states is coordinated by a system controller to provide a seamless transition of power to the critical load from the main power source, to the bridging source provided by the alternating synchronous machine/rectifier/inverter combination, to the prime mover, and back to the main power source upon restoration of power.

Accordingly, it is an object of the invention to provide a battery-less, supplemental power supply that does not require maintenance of rotational velocity of a shaft during the transitional period between detection of power outage or irregularity and the switch from main power to prime mover.

It is another object of the invention to provide a battery-less bridging power supply that can easily be retrofitted to an existing prime mover system to create uninterrupted power capability.

It is a further object of the invention to provide a battery-less bridging power supply that can be electrically retrofitted to existing prime mover systems, such as, for example, those used in hospitals having a startup time of up to 10 seconds and longer, to create an uninterrupted power capability.

It is a further object of this invention to provide a battery-less supplemental power supply that can be retrofitted to existing prime mover systems which use either a diesel or natural gas hospital-grade engine.

It is still another object of the invention to improve reliability and safety and reduce maintenance costs for an uninterrupted power supply by eliminating clutches, hydraulics, and batteries.

It is yet another object of the present invention to provide an uninterrupted power system having multiple paths to supply power to a critical load thereby eliminating single point failures.

These and other objects, and their attendant advantages, are achieved by the present invention, which provides an improved uninterrupted power supply, comprising: a synchronous alternating current machine for generating a decaying alternating current voltage when disconnected from a main power source; a voltage and frequency tolerant rectifier electrically driven by the synchronous alternating current machine, said rectifier converting the decaying current to a direct current voltage; and an inverter for converting said direct current voltage to a stable alternating current voltage.

BRIEF DESCRIPTION OF THE DRAWINGS

The invention will be described in detail herein with reference to the following figures, in which like reference numerals refer to like elements, and wherein.

DETAILED DESCRIPTION OF PREFERRED EMBODIMENTS

Figure 1:
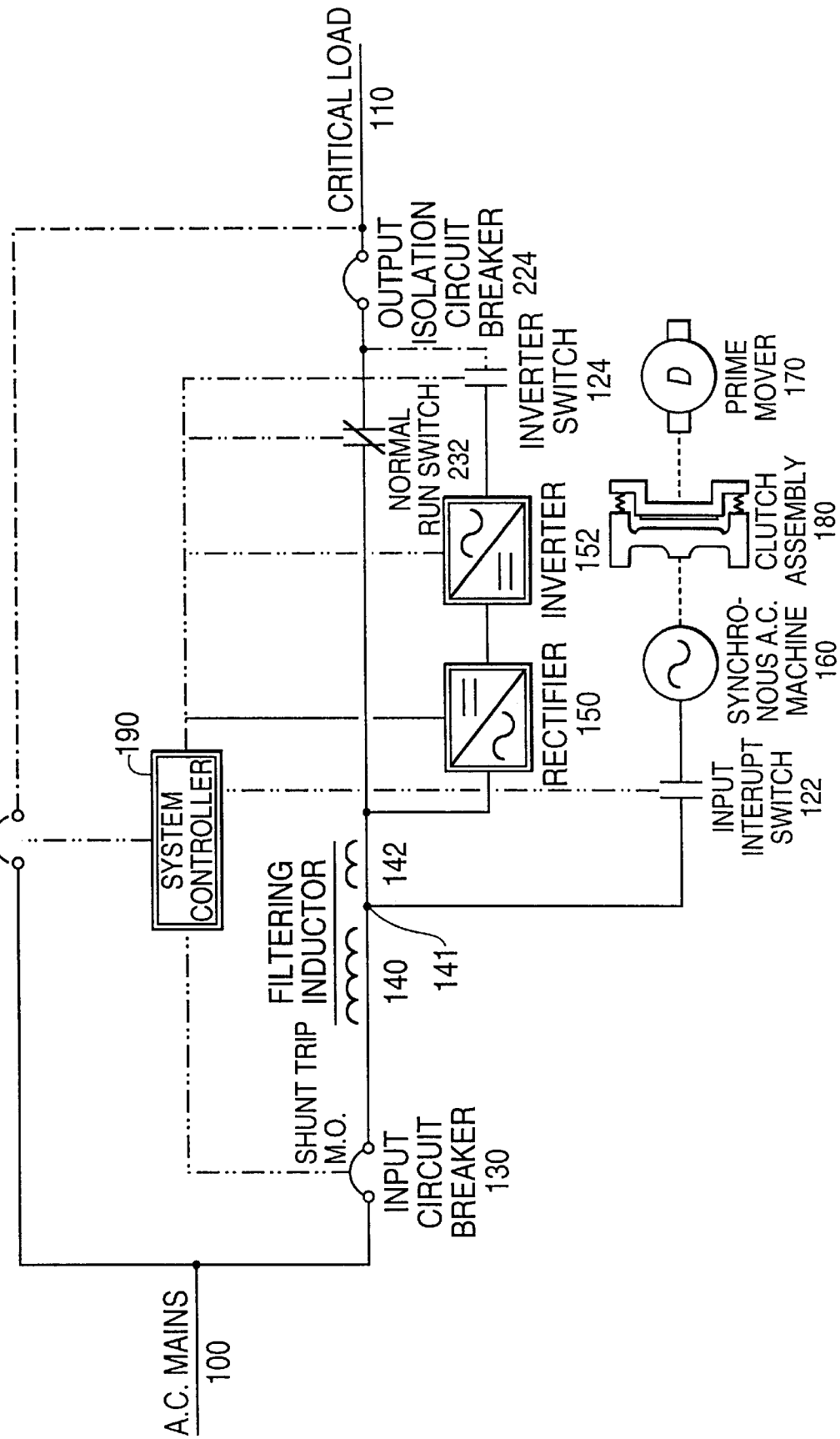
FIG. 1 is a schematic illustration of an embodiment of an uninterruptable power supply according to the present invention.

Referring to FIG. 1, a schematic illustration of a first embodiment of an uninterrupted power supply according to the present invention is shown. Primary power is ordinarily available by a main power source 100, such as, for example, a local utility provider. The normal path from the main power source 100 to the critical load 110 is provided by serial connection of an input circuit breaker 130, a first filtering inductor 140, a second filtering inductor 142, a normal run switch 232, and an output isolation circuit breaker 224. A synchronous alternating current machine 160 is connected to the junction 141 between the first filtering inductor 140 and the second filtering inductor 142 and a rectifier 150. An inverter 152 and inverter switch 124 are also serial connected in parallel connection to the normal run switch. The synchronous alternating current machine 160 is driven by a prime mover 170 via a clutch 180. A system controller 190 monitors and controls the system to effect a coordinated transfer of power from the main power source 100 to the prime mover 170 in the event of detection of insufficient or unacceptable power.

An exemplary system controller is made up of printed circuit boards comprised of combinations of analog, digital and electro-mechanical devices and circuits. The heart of the controller is a microprocessor that is programmed to monitor and control the system. The controller receives its power from both the main power source 100 and the rectifier dc output 150. The inverters used in the system are preferably solid state direct current voltage input and alternating current output transistorized power converters, including a microprocessor based pulse-width modulation inverter controller. The rectifiers are preferably solid state alternating current voltage input and direct current voltage output semiconductor controlled power converters. The inverter/rectifier efficiencies in a mega-watt system are preferably in the range of 93% and greater.

Operation of the invention will be discussed with reference to a startup sequence. It will be understood that the startup sequence is being provided only for illustrative purposes and is not intended to be limiting. Any number of various sequences known to those skilled in the art would provide acceptable performance.

Prior to application of power from the main power source 100, the input circuit breaker 130, the maintenance bypass circuit breaker 120, a synchronous AC machine switch 122, the inverter switch 124, and the normal run switch 232 are in the open position, while ouput isolation breaker 224 is in the closed position. Upon the application of power from the main power source 100, the input circuit breaker 130 is closed providing power to the system controller 190 which closes the normal run switch 232 and provides power to the critical load 110. Initial kinetic energy may be provided to the synchronous alternating current machine 160 by mechanically driving it with the prime mover 170 via the clutch 180.

The system controller 190 initiates the prime mover 170. This provides the syncronous alternating current machine 160, via the clutch 180, with the torque necessary to overcome the resting inertia, therby providing the required initial kinetic energy. Once the prime mover 170 reaches normal operating speed, the regulator (not shown) of the synchronous alternating current machine 160 is energized. The system controller 190 monitors the coincidence of the voltage across the synchronous alternating current machine switch 122. After coincidence has been detected, the synchronous alternating current machine switch 122 is closed and the prime mover 170 receives a shutdown signal from the system controller 190. The critical load 110 is now powered by the main power source 100 via input circuit breaker 130, first and second filtering inductors 140, 142 and normal run switch 232. During normal operation, the kinetic energy of the synchronous alternating current machine 160 is maintained by the main power source 100.

The system controller 190 monitors and controls the state of the switches 122, 124, the input circuit breaker 130 and the prime mover 170. The system controller 190 also monitors frequency and voltage at several points in the system to maintain a continuous status of the line power available to the critical load 110. A number of parameters may be monitored, however, it is preferable to monitor the voltage and frequency at the input circuit breaker 130, the rectifier 150, and the inverter 152. When the main power source 100 is available, the system controller 190 maintains a phase-locked inverter control signal that provides a coherent reference in the event of a prolonged main power source 100 outage.

In the event of a voltage deviation or outage (a power interrupt condition), the synchronous alternating current machine 160 becomes a generator, converting its kinetic energy to a decaying alternating current voltage. The decaying alternating current voltage drives the voltage and frequency tolerant rectifier 150 which, in turn, provides a conversion of the decaying alternating current voltage to direct current voltage. The inverter 152 converts the direct current voltage at the rectifier 150 output to a stable alternating current voltage which is required by the critical load 110. If the system controller 190 determines that line power deviation exceeds a predetermined threshold, the input circuit breaker 130 is opened, isolating any main power source parasitic loads. The inverter switch 124 is closed, connecting the critical load 110 to the inverter 152. The inverter 152 alternating current voltage which was synchronized to the main power 100 voltage by the system controller 190 prior to the outage as stated above, is now controlled by a free running oscillator in the system controller 190. Rapid, coordinated switching provides for a relatively seamless transfer of power from the main power source 100 to the inverter 152. If the absence of main power allows the synchronous alternating current machine 160 to drop below a specific amount, for example 58 Hz, while the inverter 152 maintains a fixed frequency and voltage to the critical load, a command is sent by the system controller 190 to start the prime mover 170. This arrangement keeps the system from initiating the prime mover 170 unnecessarily, as would be the case, for example, where there is a very brief transitory outage in voltage.

Prior to prime mover availability, the kinetic energy stored in the synchronous alternating current machine 160 is used to provide power to the critical load 110. It is noted that prior to the prime mover 170 availability, the synchronous alternating current machine 160 has a decaying rotational speed. The rectifier 150, which is operable over a wide frequency and voltage range converts the decaying alternating current voltage provided by the synchronous alternating current machine 160 to a direct current voltage. The inverter 152, which is also operable over a wide input range converts the direct current voltage to a stable alternating current voltage while maintaining ±0.5 Hz frequency deviation under the direction of the system controller 190. Although many conversion techniques are known to those skilled in the art, a preferred technique for conversion from direct to alternating current voltage is to use pulse-width modulation.

By properly designing the kinetic energy storage, the decaying alternating current remains within the broad input range of the rectifier 150 for a period of time sufficient to bridge the time interval between the detection of power outage, and the start and stabilization of the prime mover 170. The time period may be on the order of as many as 10 seconds for hospital-grade prime movers. Once the prime mover 170 achieves the appropriate operational conditions, the clutch 180 is engaged to mechanically supply the synchronous alternating current machine 160 with energy for conversion to a stable alternating current voltage which is translated to the critical load 110 through the rectifier 150 and the inverter 152 as described above.

Once the main power source 100 is restored, the system controller 190 will detect its presence and initiate a coordinated sequence to transfer power from the prime mover 170 back to the main power source 100. This requires synchronization by the system controller 190 of the alternating current voltage as provided by the inverter 152 and the alternating current voltage as provided by the main power source 100. Synchronizing techniques are known to those skilled in the art and, as such, will not be discussed in further detail. Once synchronization is achieved, the bypass switch 120 is closed, the inverter switch 124 is opened, the synchronous alternating current machine 160 is synchronized with the main power source 100, the input circuit breaker 130 is closed, the clutch 180 is disengaged, and the prime mover 170 is turned off. Once the synchronization between the output of the inverter 152 and the main power source 100 is achieved, the normal run switch 232 is closed, and the inverter switch 124 is opened.

As set forth above, it will be readily apparent that the present invention does not require maintenance of the rotational speed of the synchronous alternating current machine 160 during the transitory period.

Figure 2:
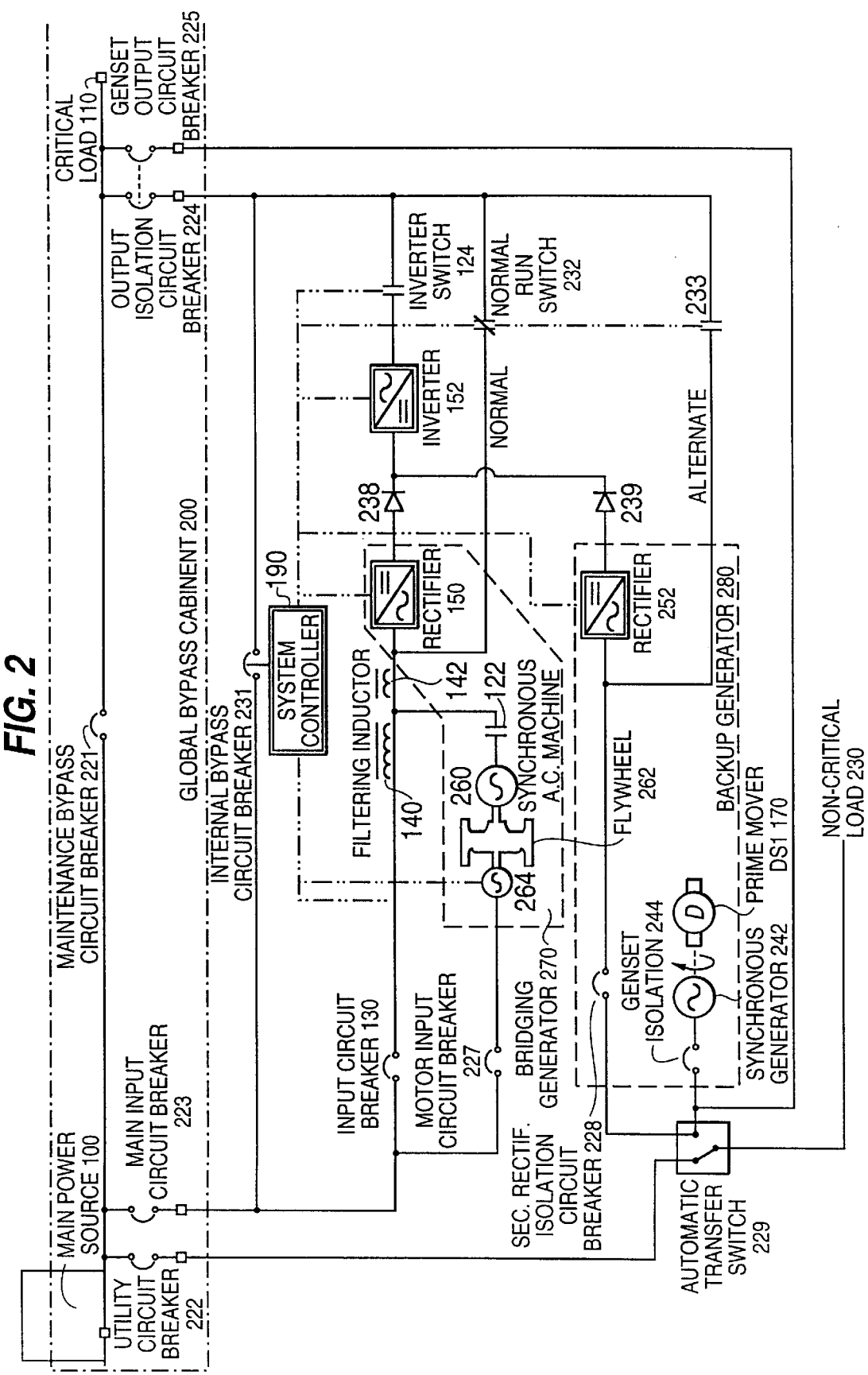
FIG. 2 is a schematic illustration of another embodiment of an uninterruptable power supply according to the present invention.

Referring now to FIG. 2, a schematic illustration of another embodiment of an uninterrupted power supply according to the present invention is provided. The embodiment illustrated in FIG. 2 has certain functional and operational advantages that may be preferable in a commercial environment.

A global bypass cabinet 200 is used to connect the main power source 100 directly to the critical load 110 via a maintenance bypass circuit breaker 221. The global bypass cabinet 200 further provides a utility circuit breaker 222 that provides main power to a non-critical load 230 via an automatic transfer switch 229. The global bypass cabinet 200 further provides a generator set output circuit breaker 225 in a direct path between a synchronous alternating current machine 242 and the critical load 110. The global bypass cabinet 200 provides a main input circuit breaker 223 and an alternate output circuit breaker 224 for connecting the main power source 100 to the critical load 110 via a direct path defined the internal bypass circuit breaker 231, or via the various components that comprise the uninterrupted power system. The global bypass cabinet 200 simply provides connection features that are more common in commercial settings where maintenance considerations and single fault protection is desired.

In the main-power state, when the two bypass switches 221, 231 are open, the electrical path from the main power source to the critical load is defined as follows. With the normal run switch 232 closed, the inverter switch 124 and alternate switch 233 open, the path is defined by the serial connection of an input circuit breaker 130, a first filtering inductor 140, a second filtering inductor 142, the normal run switch 232, and the output isolation circuit breaker 224. Additionally, with the synchronous alternating current machine switch 122 closed, the first synchronous alternating current machine 260 is driven by the voltage present between the first filtering inductor 140 and the second filtering inductor 142.

In the bridging and backup state, when the circuit breaker 130, the normal run switch 232, and the alternate switch 233 are open and the inverter switch 124 is closed, the main power source 100 is disconnected. The first synchronous alternating current machine 260 is connected to the critical load via the synchronous alternating current machine switch 122, the second filtering inductor 142, a first rectifier 150, a first diode 238, an inverter 152, the inverter switch 134, and the output isolation circuit breaker 224. In addition, a second synchronous alternating current machine 242 is connected to the inverter 152 via a generator set isolation breaker 244, a rectifier isolation circuit breaker 228, a second rectifier 252, and a second diode 239.

Additionally, the second synchronous alternating current machine 242 may be directly connected to the critical load 110 via the generator set isolation breaker 244, the rectifier isolation circuit breaker 228, the alternate switch 233, and the output isolation circuit breaker 224.

The non-critical load 230 may be directly connected to the second synchronous alternating current machine 242 via the automatic transfer switch 229 and the generator set isolation breaker 244.

The first synchronous alternating current machine 260 may optionally be driven by a directly coupled motor 264, such as, for example, a pony motor, and a flywheel 262. The motor 264, which may be used to overcome the resting inertia of the synchronous alternating current machine 260, receives power from the main power source 100 via the main input circuit breaker 223 and a motor input circuit breaker 227. The second synchronous alternating current machine 242 is driven by a directly coupled prime mover 170 and supplies the second rectifier 252 with a stable alternating current voltage via the generator set isolation breaker 244 and the rectifier isolation breaker 228.

Operation of this embodiment is similar to that described above with reference to FIG. 1 with minor differences made to enhance commercial viability. Prior to application of power from the main power source 100, all circuit breakers 221, 222, 223, 224, 225, 130, 227, 228, 231 are open, except the generator isolation breaker 244, all switches 122, 124, 232, 233 are open and the automatic transfer switch 229 connects the non-critical load 230 with the open utility circuit breaker 222.

If the optional global bypass cabinet 200 were not present an acceptable power-up sequence would be as follows. Upon application of power from the main power source 100, input circuit breaker 130 closes automatically under the direction of the system controller 190. Power is now provided to the critical load 110 by the serial connection of the input circuit breaker 130, the first and second filtering inductors 140, 142, and normal run switch 282.

With the global bypass cabinet 200 present several additional steps may be implemented. First the maintenance bypass circuit breaker 221 is closed supplying the critical load 110 with power provided from the main power source 100. The output isolation breaker 224 and the main input isolation breaker 223 are closed. The input circuit breaker 130 and the normal run switch 232 close automatically under the direction of the system controller 190.

The maintenance bypass circuit breaker 221 is opened.

The remaining portion of the system as described above is in the same state whether the global bypass cabinet 200 is present or not. The utility circuit breaker 222 may be optionally closed providing power to the non-critical load 230. Closing the motor input circuit breaker 227 allows for the startup sequence to begin.

The system controller 190 initiates the motor 264. This provides the synchronous alternating current machine 260 with the torque necessary to overcome the resting inertia, thus providing the initial kinetic energy. Once the motor 264 reaches slip speed, the regulator of the first alternating current machine 260 is energized. The system controller 190 monitors the coincidence of the voltage across the synchronous alternating current machine switch 122. After coincidence is detected, the synchronous alternating current machine switch 122 is closed and the motor 264 control is de-energized, disconnecting the motor 264 from the main power source 100. The critical load 110 is now powered by the main power source 100 via the first and second filtering inductors 140, 142. Additionally, the main power source 100 maintains the kinetic energy of the alternating current machine 260.

The first rectifier 150 and the inverter 152 are activated. The inverter 152 is synchronized by the system controller 190 with the voltage at the normal run switch 232. At this point of the sequence, kinetic energy has been stored in the motor 264, flywheel 262, and first synchronous alternating current machine 260. Analogous to the description provided for FIG. 1, the first alternating current machine 260 and first rectifier 150 act as a bridging generator 270 to transform decaying kinetic energy to a direct current voltage that is, in turn, converted to a stable alternating current voltage while maintaining ±0.5 Hz freqency deviation by the inverter 152 until a backup generator 280 formed by the prime mover 170, the second synchronous alternating current machine 242, and the second rectifier 252 becomes available.

The bridging generator 270 and the backup generator 280 are connected via diodes 238, 239 to the inverter 152. The diode 238, 239 connection provides a passive means for the largest available direct current voltage source to drive the inverter 152. The bridging generator 270 also provides an alternating current voltage connection that is inductively coupled 140, 142 to the main power source 100 and the critical load 110. This connection provides a smoothing or filtering function to remove voltage transients present from the main and also allows the main power source 100 to maintain the kinetic energy of the bridging generator 270.

In the event the system controller 190 determines the main power source 100 is supplying insufficient voltage (or experiencing some other power interrupt condition), the main power source 100 is isolated. The input circuit breaker 130 opens and the inverter switch 124 closes. This provides a synchronous transfer of power from the main power source 100 via the second filtering inductor 142 to the decaying synchronous alternating current machine 260 via the inverter 152. The inverter 152 preferably uses pulse-width modulation to convert the direct current voltage supplied by the bridging generator 270 to a stable alternating current voltage and frequency required by the critical load 110.

If the kinetic energy drops below a predetermined level, such as, for example, 58 Hz, the prime mover 170 is started. This arrangement keeps the system from initiating the prime mover 170 unnecessarily, as would be the case, for example, where there is a very brief transitory outage in voltage. The rectifier isolation circuit breaker 228 is closed allowing the backup generator 280 to supply the inverter 152 via the second rectifier 252 and second diode 239. The first synchronous alternating current machine 260 is turned off after the prime mover 170 has stabilized. The inverter 152 is synchronized with the voltage and frequency at the alternate switch 233, generated by the second synchronous generator 242, to provide an internal alternate bypass path via the alternate switch 233.

Once power resumes at the main power source 100, the system controller 190 transfers the critical load 110 from the prime mover 170 back to the main power source 100. This requires resynchronization of the inverter 152 with the main power source 100 voltage and synchronization of the first alternating current machine 260 with the same. Once coincidence is established, the main power source 100 resumes power delivery and the prime mover 170 is shut down. The uninterruptable power supply is again prepared to service the next power outage.

As is evident in the above description, the embodiment disclosed in FIG. 2 provides numerous protective features, bypasses, and maintenance features that are desirable in commercial systems. It will be apparent to one skilled in the art that there are numerous modifications that can be made to provide the equivalent functionality provided by the tandem operation of the bridging 270 and backup 280 generators. An example includes the addition of filtering after the input circuit breaker 130 to improve transient voltage suppression, filtering, power factor correction, and voltage regulation. Furthermore, the starting mechanism of the prime mover 170 may be a pressure start system as opposed to a battery start system to completely eliminate all batteries from the system. Additionally, the first synchronous alternating current machine 260 may be driven by the variable frequency and voltage output of the solid state inverter 152. The inverter 152 may be used to overcome the resting inertia of the synchronous alternating current machine 260 by ramping up both the voltage and frequency to accommodate a soft start. The bridging generator 270 could be electrically retrofitted to an existing prime mover system with the use of a distributed or centralized system controller. Replacement of a given set of components with a functional analog, such as, for example, the substitution of a direct current generator as opposed to the synchronous alternating current machine/rectifier combination, is another potential modification. Tandem operation of multiple systems with integrated control is an additional option.

The invention is particularly well suited to upgrading existing engine/generator systems, such as, for example, hospitals or industrial applications. The invention does not rely on any logic interface and/or mechanical adaptation to achieve the advantages thereof.

The above description provides a basic description of the construction and operation of the present invention. Numerous variations are appropriate to achieve variations in performance, reliability, size, weight, ease of manufacturing, cost, and other design features.

Moreover, different materials, manufacturing techniques, and orientations may better suit a specific application. Wherever a patent application or patent is referenced herein, it should be deemed to be incorporated by reference in its entirety as to subject matter disclosed therein.

While this invention has been described in conjunction with specific embodiments thereof, it is evident that many alternatives, modifications and variations will be apparent to those skilled in the art. Accordingly, the preferred embodiments of the invention, as set forth herein, are intended to be illustrative, not limiting. Various changes may be made without departing from the true spirit and full scope of the invention, as defined in the following claims.

What is claimed is:

1. A supplemental power supply comprising:
a synchronous alternating current machine connected to a moveable member, said synchronous alternating current machine being provided in a circuit that is connected to and running parallel with an alternating current line that extends, during a normal operating condition to a main power source, such that said synchronous alternating current machine:
  (1) regulates power supplied from said main power source to a terminal for connection of a critical load; and
  (2) maintains kinetic energy in said movable member,
and wherein during a power interrupt condition said alternating current line is disconnected from said main power source and said synchronous alternating current machine serves to generate a decaying alternating current voltage from said kinetic energy;
a rectifier for converting said decaying alternating current voltage to a direct current voltage; and
an inverter for converting said direct current voltage to a stable alternating current voltage for supply to said terminal.

2. The supplemental power supply of claim 1, further comprising:
a system controller, said system controller maintaining a stable frequency by controlling a frequency difference between said stable alternating current voltage and a voltage from said main power source and by maintaining said frequency within a predetermined tolerance in the absence of power from said main power source.

3. The supplemental power supply of claim 1, wherein said movable member comprises a flywheel.

4. The supplemental power supply of claim 1, further comprising:
a motor connected to said synchronous alternating current machine for providing startup energy to said synchronous alternating current machine prior to connection of said synchronous alternating current machine to said main power source.

5. The supplemental power supply of claim 3, further comprising:
a motor, said motor providing startup energy to said synchronous alternating current machine and said flywheel prior to connection of said synchronous alternating current machine to said main power source.

6. The supplemental power supply of claim 2, wherein said movable member comprises a flywheel;
said power supply further comprising a motor connected to said flywheel and said synchronous alternating current machine, wherein said system controller further controls a startup sequence where said motor provides kinetic energy to said flywheel and said synchronous alternating current machine.

7. The supplemental power supply of claim 2, further comprising:
a prime mover connected to said synchronous alternating current machine, said prime mover driving said synchronous alternating current machine to provide a stable alternating current voltage to said rectifier.

8. The supplemental power supply of claim 1, wherein said rectifier is frequency and voltage tolerant.

9. The supplemental power supply of claim 7, further comprising:
a clutch disposed between said prime mover and said synchronous alternating current machine, said clutch providing power to said synchronous alternating current machine from said prime mover.

10. The supplemental power supply of claim 1, wherein said synchronous alternating current machine regulates said power by filtering to substantially remove voltage transients.

11. The supplemental power supply of claim 1, wherein said circuit is inductively coupled to said alternating current line.

12. An uninterruptable power supply comprising:
a prime mover;
a clutch connected to said prime mover;
an input interrupt switch;
a synchronous alternating current machine connected to a moveable member, said synchronous alternating current machine being provided in a circuit that is connected to and running parallel with an alternating current line that extends, during a normal operating condition, to a main power source, via said input interrupt switch, such that said synchronous alternating current machine:
 (1) regulates power supplied from said main power source to a terminal for connection of a critical load; and
 (2) maintains kinetic energy in said movable member,
and wherein during a power interrupt condition said input interrupt switch is opened to disconnect said main power source from said alternating current line, whereby said synchronous alternating current machine generates a first stable alternating current voltage when mechanically driven by said prime mover via said clutch, and generates a decaying alternating current voltage and frequency when said clutch is disengaged;
a rectifier electrically connected to said synchronous alternating current machine, said rectifier for converting said first stable alternating current voltage and said decaying alternating current voltage and frequency to a direct current voltage;
an inverter for converting said direct current voltage to a second stable alternating current voltage for supply to said terminal; and
a system controller for sensing presence of a power interrupt condition and automatically reconfiguring said uninterruptable power supply by transferring a power generation function to the prime mover in a coordinated sequence.

13. The apparatus in claim 12, further comprising:
a bypass for disconnecting said synchronous alternating current machine from said rectifier and for electrically connecting said synchronous alternating current machine to said critical load.

14. The uninterruptable power supply of claim 12, wherein said synchronous alternating current machine regulates said power by filtering to substantially remove voltage transients.

15. The uninterruptable power supply of claim 12, wherein said circuit is inductively coupled to said alternating current line.

16. An uninterruptable power supply comprising:
a bridging generator electrically connected to said main power source and for generating a decaying direct current voltage when disconnected from said main power source;
a backup generator for providing a stable direct current voltage subsequent to the detection of an unacceptable main power condition;
an inverter for converting said decaying direct current voltage and said stable direct current voltage to a first stable alternating current voltage and frequency; and
a system controller for sensing the presence of a power interrupt condition, controlling a start-up sequence of said backup generator, and automatically reconfiguring said uninterruptable power supply by transferring power generation to the bridging generator and then to the backup generator in a coordinated sequence,
wherein said bridging generator comprises a first synchronous alternating current machine connected to a moveable member, said first synchronous alternating current machine being provided in a circuit that is connected to and running in parallel with an alternating current line that extends, during a normal operating condition, to a main power source, such that said first synchronous alternating current machine:
 (1) regulates power supplied from said main power source to a terminal for connection of a critical load; and
 (2) maintains kinetic energy in said member,
and wherein during a power interrupt condition said main power source is disconnected from said alternating current line and said first synchronous alternating current machine serves to generate a decaying alternating current voltage and frequency from said kinetic energy.

17. The uninterruptable power supply of claim 16, wherein said bridging generator further comprises a first rectifier for converting said decaying alternating current voltage and frequency to said decaying direct current voltage.

18. The uninterruptable power supply of claim 17, wherein said backup generator comprises:
a prime mover;
a second synchronous alternating current machine for generating a second stable alternating current voltage and frequency when mechanically driven by said prime mover; and
a second rectifier electrically connected to said second synchronous alternating current machine for converting said second stable alternating current voltage and frequency to said stable direct current voltage.

19. The uninterruptable power supply of claim 17, wherein said bridging generator further comprises a motor; and wherein said movable member comprises a flywheel coupled to said motor, said motor providing kinetic energy to said synchronous alternating current machine and said flywheel prior to connection of said synchronous alternating current machine to said main power source.

20. The uninterruptable power supply of claim 17, further comprising a first switch;
a first inductor, wherein said first switch and said first inductor are serially connected in said alternating current line and electrically couple said main power source to said first synchronous alternating current machine;
a second inductor connecting said first inductor and said rectifier; and
a second switch connecting said terminal to said second inductor, wherein said main power source is inductively connected to said critical load by said first inductor and said second inductor when said first switch and said second switch are closed.

21. The uninterruptable power supply of claim 18, wherein said prime mover uses a pressure start.

22. The uninterruptable power supply of claim 16, further comprising
a first diode for electrically connecting said bridging generator to said inverter; and
a second diode for electrically connecting said backup generator to said inverter.

23. The uninterruptable power supply of claim 16, wherein said first synchronous alternating current machine regulates said power by filtering to substantially remove voltage transients.

24. The uninterruptable power supply of claim 16, wherein said circuit is inductively coupled to said alternating current line.

25. A method for sustaining a stable alternating current voltage and frequency upon the occurrence of a power interrupt condition, comprising the steps of:

connecting, during a normal operating condition, a synchronous alternating current machine with a main power source by way of a circuit connected to and running parallel with an alternating current line extending to said main power source, such that said synchronous alternating current machine:
  (1) maintains kinetic energy in a moveable member; and
  (2) regulates power supplied by said main power source to a critical load, generating a coincident inverter control signal with a voltage from the main power source during said normal operating condition;

detecting a presence of insufficient voltage from the main power source;

measuring a duration of the insufficient voltage;

disconnecting said synchronous alternating current machine from said main power source when said duration of the insufficient voltage exceeds a defined time indicating a power interrupt condition;

generating a free running inverter control signal coherent with said coincident inverter control signal when the main power source is disconnected;

converting said kinetic energy to a decaying alternating current voltage and frequency with said synchronous alternating current machine when the main power source is disconnected;

rectifying said decaying alternating current voltage and frequency to provide a direct current voltage;

inverting said direct current voltage to provide said stable alternating current voltage and frequency; and applying said stable alternating current voltage and frequency to said critical load.

26. The method in claim 25, further comprising the steps of:

initiating a prime mover subsequent to the detection of insufficient voltage;

stabilizing said prime mover; and transferring power from said prime mover to said synchronous alternating current machine for maintenance of said stable alternating current voltage.

27. The method in claim 25, further comprising the steps of:

initiating a prime mover subsequent to the detection of insufficient voltage;

transferring power from said prime mover to a second synchronous alternating current machine;

generating an intermediate alternating current voltage and frequency with said second synchronous alternating current machine;

converting a said intermediate alternating current voltage and frequency to a stable direct current with a second rectifier; and applying said stable direct current voltage to said inverter to generate said stable alternating current voltage and frequency.

28. The method of claim 25, wherein said regulation comprises filtering to substantially remove voltage transients.

29. The method of claim 25, wherein said circuit is inductively coupled to said alternating current line.

* * * * *